US005680483A

United States Patent [19]
Tranchard

[11] Patent Number: 5,680,483
[45] Date of Patent: Oct. 21, 1997

[54] METHOD AND DEVICE FOR CODING DIGITAL SIGNALS WHICH ARE REPRESENTATIVE OF A SEQUENCE OF PICTURES

[75] Inventor: Lionel Tranchard, Maisons-Alfort, France

[73] Assignee: U.S. Philips Corporation, New York, N.Y.

[21] Appl. No.: 392,632

[22] Filed: Feb. 22, 1995

[30] Foreign Application Priority Data

Mar. 2, 1994 [FR] France ................ 9402382
May 26, 1994 [FR] France ................ 9406380

[51] Int. Cl.⁶ .......................... G06K 9/36; G06K 9/46
[52] U.S. Cl. .............. 382/239; 348/405; 348/419; 382/236; 382/251
[58] Field of Search .................... 382/235, 239, 382/250, 251, 236; 348/405, 419; 358/261.2, 430

[56] References Cited

U.S. PATENT DOCUMENTS

| | | | |
|---|---|---|---|
| 5,038,209 | 8/1991 | Hang | 348/405 |
| 5,144,424 | 9/1992 | Savatier | 348/405 |
| 5,231,484 | 7/1993 | Gonzales et al. | 358/133 |
| 5,241,383 | 8/1993 | Chen et al. | 348/405 |
| 5,265,180 | 11/1993 | Golin | 382/236 |
| 5,301,242 | 4/1994 | Gonzales et al. | 382/239 |
| 5,333,012 | 7/1994 | Singhal et al. | 348/405 |

OTHER PUBLICATIONS

"Two Layer Video Coding for ATM Networks" G. Morrison et al, Signal Processing: Image Communication vol. 3, Nos. 2–3, Jun. 1991, pp. 179–195.

Primary Examiner—Joseph Mancuso
Assistant Examiner—Timothy M. Johnson
Attorney, Agent, or Firm—Laurie E. Gathman

[57] ABSTRACT

A device for coding a sequence of pictures divided into successive groups of N pictures arranged in picture blocks or macroblocks and including at least one channel for quantization and variable length coding of the blocks or macroblocks, and a bitrate control sub-assembly. The sub-assembly includes a buffer memory and a device for modifying the quantization step used in quantization of the blocks or macroblocks. The buffer memory and the device for modifying the quantization step are connected in series. The device for modifying the quantization step includes, in series, a first stage for allocating bits for each successive picture of the sequence of pictures, a second stage for allocating bits for the current picture and the (N–1) subsequent pictures, a third stage for correcting the bit allocation for each new picture to be coded, a fourth stage for modifying the quantization step as a function of the corrected bit allocation, and, optionally, a fifth stage for implementing complementary processing operations.

22 Claims, 5 Drawing Sheets

METHOD AND DEVICE FOR CODING DIGITAL SIGNALS WHICH ARE REPRESENTATIVE OF A SEQUENCE OF PICTURES

BACKGROUND OF THE INVENTION

1. Field of the Invention

The invention relates to a method of coding digital signals which are representative of a sequence of pictures arranged in successive groups of N pictures each and subdivided into slices each regrouping a given number of picture macroblocks, comprising at least a step of quantizing and coding said signals and a step of controlling the bitrate of the coded signals by computing a complexity value of the picture and modifying the quantization step of the signals to be coded as a function of the complexity thus computed.

For performing this method, the invention also relates to a device for coding digital signals which are representative of a sequence of pictures arranged in successive groups of N pictures each and subdivided into slices each regrouping a given number of picture macroblocks, comprising at least means for quantizing and coding said signals associated with means for controlling the bitrate of the coded signals by computing a complexity value of the picture and modifying the quantization step of the signals to be coded as a function of the complexity thus computed.

2. Description of the Prior Art

The invention is essentially used in the field of transmitting or storing coded pictures. The invention is notably applicable in a variable-length coder which is compatible with the MPEG-2 standard (MPEG is an abbreviation of "Moving Picture Expert Group", a group of experts of the international standardization organization ISO: before the detailed description of the invention, the essential features of a data stream in conformity with this MPEG-2 standard adopted by ISO for transmitting and/or storing animated pictures will be dealt with).

Numerous documents, and, for example the article "Two-layer video coding for ATM networks" by G. Morrison and D. Beaumont, published in "Signal Processing: Image Communication", vol. 3, nos. 2-3, June 1991, pp. 179-195, describe the basic structure of video coders provided to function at a constant bitrate. In this field, U.S. Pat. No. 5,231,484 particularly describes a method and system of compressing video signals which are compatible with the MPEG standard and are based on a principle of controlling the bitrate of the output buffer memory of the variable-length coding device arranged in the coder.

Although such known methods of compressing data, and particularly those which are compatible with the MPEG specifications, have for their object to effectively maintain a constant bitrate on average, a certain freedom nevertheless remains to fix the number of bits individually assigned to each picture of the sequence to be treated (assigning exactly the same number of bits to each picture would lead to a subsequent reconstitution of a sequence of pictures having a more fluctuating quality). To this end, the coder described, for example in U.S. Pat. No. 5,231,484 comprises a system of allocating bits in which the method of defining the number of desirable bits per picture consists of determining, per picture, a measure of the difficulty of compressing and coding the pictures and then evaluating, thanks to the presence of a virtual memory whose fullness is computed as a function of said measure, the value of the quantization step in the operation of quantizing the picture signals during coding.

However, any coding which is compatible with the MPEG standard (as may be recalled, this standard only specifies the organization of the data stream representing the compressed pictures and the characteristic features of the decoding process to be performed by a decoder so as to be qualified as being compatible with the standard) first regroups pictures into groups of pictures referred to as GOPs ("Group Of Pictures") each comprising a given number of consecutive pictures, and the allocations of bits are then predefined per GOP. A frequent result is that certain pictures at the start of the GOP take up a considerable part of the allocation of the GOP and the last pictures of the group no longer have enough individual allocations to maintain a sufficient picture quality. This technical problem becomes even more serious when these future video applications are introduced in television programmes, which renders it practically necessary to have bitrates which are variable in accordance with these programmes, or bitrates all of which are at least switchable. In these applications it should be possible to modify the video bitrate of a programme without interrupting the service at the instant of changing the bitrate, and with a certain flexibility in the reallocation of bits, which is not possible in current embodiments.

SUMMARY OF THE INVENTION

Thus, it is a first object of the invention to propose a coding method with which, in response to this new type of problem, the bitrate can be switched without any interruption or perturbation of the broadcast service, particularly during the period of transition of one bitrate to another, and which effectively has this flexibility in the assignments of bits per picture in the sequence of signals corresponding to said transmitted programmes.

To this end, the invention relates to a coding method as described in the opening paragraph, which is characterized in that:

(A) said complexity is defined as a number of bits per picture proportional to the number of bits observed at the end of coding;

(B) the step of controlling the bitrate comprises the following sub-steps:

(1) for each given group of N successive pictures, evaluation of a number of bits referred to as the group profile, having a value PROF which is proportional to said complexity, to the number N and to the bitrate $R(t)$ observed at the coding output, and inversely proportional to the period of the pictures;

(2) for each new current image to be coded in the sequence:

(a) estimation of a number of bits corresponding to this picture and having a value NBNP which is proportional to:

said complexity;

a number of bits per sliding group having a value NBSG which is proportional to said group profile and to the difference between the value of NBSG for the preceding picture and the total number of bits per picture, each sliding group being defined as a composition of said new picture and (N−1) pictures which are adjacent thereto and with which they form a group shifting by one picture at each new picture;

(b) correction of said estimation by evaluating a corrected number of bits corresponding to said picture and having a value CNNP chosen from three values comprising the estimated value NBNP as well as two limit values MIN(CN) and MAX(CN) of the fullness of a buffer memory for storing coded signals, the selection criterion being the selection of that value which is between the two other values;

(3) for each macroblock of said new picture, computation of a coefficient for modifying the quantization step of this macroblock, said coefficient being equal or proportional to the sum of a number of bits expressing the initial fullness of a buffer memory referred to as virtual memory and a complementary number which is equal to the number of bits already generated by coding the (j−1) macroblock preceding the macroblock concerned of the rank j in the same picture, reduced by a number of correction bits related to the values of j and CNPP and to the number of macroblock per picture.

In this coding process, each sliding group for each new picture is preferably composed of this picture and (N−1) pictures which follow. However, independent of the structure of this sliding group, a particular embodiment of the invention is characterized in that said complexity, denoted X, is defined as being equal to the product of the number of bits observed at the end of coding by the average quantization step taken on a picture.

A perfected variant of the invention is characterized in that, while the pictures of the sequence are of a different type T referred to as I, P or B, respectively, dependent on whether they are subjected to an intraframe coding mode which is independent of any other picture, or to a predictive coding mode using a unidirectional motion prediction based on another intraframe coded or predicted picture, or to a bidirectional interpolation coding mode based on a previous picture and a subsequent picture, said complexity, denoted $X(T)$, is defined as being equal to the product of the number of bits $S_i(T)$ observed at the end of coding a picture of the same type T by the avenge quantization step $Q_i^m(T)$ taken on a picture of the same type T.

This variant may be given a supplementary perfection in that, while the pictures are of the type P, said complexity is defined as being equal to the smallest of said products $(S_i(T) \times Q_i^m(T))$ and $(S_{i-1}(T) \times Q_{i-1}^m(T))$ computed for the current picture and for a or the preceding picture of the same type P, respectively.

Independent of the mode of definition of the complexity, initial values are imposed in all cases on said complexity for the first pictures of a sequence, so long as they are insufficient in number for constituting a group of pictures.

In the particularly envisaged embodiment, in which the pictures of the sequence are of the type I, P or B, the value of the group profile, designated by PROF(T), is computed per type of picture at the start of each given group and for the entire duration of this group. In accordance with a preferential mode of determining this value, each value PROF(T) for T=I, P, or B is proportional to the expression $X(T) \times N \times R(t)$ computed for each type of picture T at the start of each given group.

It is another object of the invention to provide a coding device with which said coding method can be carried out, i.e. which effectively allows a modification by switching the output bitrate without perturbing the broadcast service.

To this end, the invention relates to a coding device as defined above and described in the opening paragraph, which is characterized in that said means for controlling the bitrate comprise:

(A) means for evaluating the complexity as a function of the number of bits observed at the end of coding and as a function of the avenge quantization step taken on a picture;

(B) means for estimating a number of bits NBNP referred to as allocation of bits and evaluated for each new current picture to be coded in the sequence as a function of:
  (1) a number of bits referred to as group profile whose value PROF computed successively for each given group of N pictures is proportional to the complexity, to the number N and to the bitrate R(t) observed at the coding output and inversely proportional to the period of the pictures;
  (2) the following values, evaluated for each picture of the sequence:
    (a) the complexity;
    (b) a number of bits per sliding group having a value NBSG which is proportional to said group profile and to the difference between the value of NBSG for the preceding picture and the total number of bits per picture, each sliding group being defined as a composition of said new picture and (N−1) pictures which are adjacent thereto and with which they form a group shifting by one picture at each new picture;

(C) means for correcting the allocation of the bits for determining for each new picture to be coded a corrected number of bits referred to as corrected allocation of bits CNNP substituting said allocation value of bits NBNP and whose value is chosen from three values comprising said non-corrected allocation value NBNP estimated previously and two limit values MIN(CN) and MAX(CN) of the fullness of a buffer memory for storing the coded signals, the selection criterion being the selection of that value which is between the two other values;

(D) means for modifying the quantization step of each macroblock of said new picture with the aid of a modification coefficient which is equal or proportional to the sum of a number of bits expressing the initial fullness of a buffer memory referred to as virtual memory and a complementary number which is equal to the number of bits already generated by coding the (j−1) macroblocks preceding the macroblock concerned of the rank j in the same picture, reduced by a correcting number of bits related to the values of j and the corrected allocation of bits CNNP and to the number of macroblocks per picture.

The device thus proposed is suitable for carrying out the method by proceeding through a series of instructions constituting software and executed under the control of a microprocessor or computer, said successive instructions ensuring the execution of various stages of definition, evaluation, estimation, correction and computation as described hereinbefore.

However, this is not the only possible mode of realisation. In another variant of performing the method described above, the coding device according to the invention may be realised in the form of successive electronic modules, said means for controlling the bitrate comprising:

(A) a stage for determining the complexity for each new current picture to be coded as a function of the number of bits corresponding to the coded signals and of the avenge quantization step taken on a picture;

(B) a sub-assembly for modifying the quantization step, comprising in series:
  (a) a stage for determining the allocation of bits NBSG per sliding group of pictures, the sliding group being the one which includes said current picture to be coded and the subsequent (N−1) pictures;
  (b) a stage for correcting the allocation of bits for each new current picture to be coded as a function of said allocation NBSG per sliding group of pictures and of said limit values of the fullness of the buffer memory for storing the coded signals;

(c) a stage for modifying the quantization step as a function of said corrected allocation of bits CNNP.

In a coding device as described here, the process of controlling the bitrate of the output buffer memory of this device is usually realised essentially as a function of the fullness of this memory. In a coding device processing a data stream of the MPEG type, i.e. whose signals which are representative of the sequence of pictures are assembled in successive groups of pictures (or GOPs), a given number of bits (or quota, or contingent) is generally allocated per GOP. However, the pictures themselves individually require for their coding a number of bits which is different according to their type (for example, by referring to picture types I, P, B as defined above, it is found that a picture of the type I requires a contingent of bits which is two to three times higher than that which requires a picture of the type P, which, in its turn, requires a contingent which is three to five times higher than that for a picture of the type B) and, with the effect of the control process which may have to use the GOP quota progressively, the quality of the picture deteriorates towards the end of this GOP as compared with that which is at the start of the GOP. For a complexity which is hardly greater and thus has no considerable influence on the global cost of the coding device, the importance of the process and the device presented here is to effect the bitrate control no longer in successive groups of real pictures having a length of N pictures as defined in an MPEG data stream, but in sliding groups of pictures (or SGOP, i.e. Sliding GOP: a SGOP has the same length as a GOP but is reconstituted at each new picture to be coded and comprises for example said new picture and the (N-1) pictures which follow), and to re-evaluate permanently at each new current picture (and thus independently of the position thereof in a real GOP) the number of bits which may be allocated for coding these N successive pictures of the SGOP. This continuous update provides the possibility of a more precise estimation of the contingent of useful bits for each picture and the control by modifying the quantization step which results therefrom and is, at it were, reinitialized at the start of each new picture, remains very efficient and rapid even when the complete scene is changed, while ensuring that the variations of the picture quality remain limited and are effected smoothly while they are exempt from any periodicity effect of the GOP, of faults in the transition between pictures and of any other artifact of a similar nature.

While the successive pictures of the sequence are of the type I, P or B, the coding device is such that the stage for determining the complexity for each new picture to be coded comprises:

(a) a first memory for storing initialization values of the complexity for the first picture to be coded, and a first circuit for multiplying the number of bits resulting from coding the current picture via the output of a circuit for computing the average quantization step per picture;

(b) a circuit for selecting a single one of the four outputs of said first memory and said first multiplication circuit in accordance with the type I, P or B of the current picture and dependent on whether said current picture of the given type is or not the initial picture of the sequence, the output of said selection circuit constituting said complexity of the current picture concerned.

In a perfected variant of the embodiment, said stage for determining the complexity also comprises:

(c) a second multiplication circuit receiving, via a second storage memory, the number of coding bits and the average quantization step which correspond to the picture of the same type preceding the current picture, the selection circuit also receiving the output of said second multiplication circuit for selecting a single one of the five outputs of said first memory and said first and second multiplication circuits in accordance with the type of current picture and dependent on whether this current picture of the given type is the initial picture of the sequence.

In either case, the stage which follows this stage for determining the complexity, viz the stage for determining the allocation of bits NBSG per sliding group of pictures preferably comprises a circuit for computing the profile, or fixed allocation, for a given group of N successive pictures of the sequence, said computation being effected as a function of the type I, P, B and of the complexity of the first picture of this given group, and a circuit for estimating a number of bits, or allocation, per sliding group of pictures, said estimation being given by the following expression:

$$NBSG=NBSG-NBPP+PROF(T)$$

in which:

PROF(T) is said computed profile;

NBPP is the total number of bits per picture;

NBSG for the first picture of said sliding group of pictures is equal to an initialization value $NBSG_0=NBRG$ and for the subsequent pictures is the value NBSG obtained by the update effected in accordance with said expression;

NBRG represents the global allocation for said given group and is defined by the following expression:

$$NBRG=NR_2/P+WBF-F_e(GOPST)+(R_1-R_2)D_b$$

in which:

$F_e(GOPST)$ designates the real fullness of the buffer memory for storing the coded signals;

P designates the period of the pictures;

$R_1$ and $R_2$ designate the bitrate at the output of said buffer memory before and after the bitrate switching order, respectively, with $R_1=R_2=R(t)$ in the absence of bitrate switching;

$D_b$ is the sum of the delays $D_{eb}$, and $D_{db}$, due to said buffer memory of the coding device and to the buffer memory at the decoding end, to be associated therewith in a corresponding manner in a decoding device;

WBF is the wished fullness of said buffer memory at the start of each given group and is defined by the expression $WBF=F_{min}(t)+4R_2/(P \times NBSP)$ in which NBSP is a constant designing the number of picture slices per picture and $F_{min}(t)$ is the absolute lower limit of the fullness of said buffer memory.

If there is a change of bitrate (switching from $R_1$ to $R_2$), it is preferable that the instant of validation of the arbitrary switching order of the bitrate by said device coincides with the start of one of said given picture groups of the sequence.

With or without a change of bitrate, following the stage for determining the allocation per sliding group, the stage for correcting the allocation of bits for each new picture to be coded preferably comprises a circuit for evaluating the number of bits, or allocation, envisaged for the next picture of said given group, followed by a circuit for correcting said allocation, and the stage for modifying the quantization step preferably comprises, in series, a circuit for initializing the fullness of a virtual buffer memory, a circuit for computing the current fullness of said virtual memory and a circuit for determining the quantization step of each macroblock of the current picture.

Finally, the coding device according to the invention may also comprise a stage for complementary processing operations, which stage comprises a first processing circuit in the event of underflow of coded data, whose output is connected to the circuit for initializing the fullness of the virtual memory, and a second processing circuit in the event of overflow of coded data, whose output is connected to the input of the quantization and coding means and to said circuit for initializing the fullness of the virtual memory.

BRIEF DESCRIPTION OF THE DRAWING

These and other aspects of the invention will be apparent from and elucidated with reference to the embodiments described hereinafter.

In the drawings.

DETAILED DESCRIPTION OF THE PREFERRED EMBODIMENTS

A sequence of digital signals as received by the coding device according to the invention in conformity with animated pictures comprises information relating to the luminance component Y and information relating to the chrominance components or colour difference signals U and V. The grey levels for the luminance component Y and the colour levels for the signals U and V are expressed by digital words of 8 bits regrouped in matrices. In accordance with the MPEG standard, the input format is such that the chrominance is subjected to a sub-sampling by four with respect to the luminance. There are thus two values which are related to the colour (one for U, the other for V) for four luminance values. As the word matrices are divided into blocks of 8×8 pixels, four adjacent blocks of the matrix Y correspond to a block of the matrix U and to a block of the matrix V, and these six blocks combined constitute a macroblock (MB). These blocks and macroblocks are the units for subdividing the picture which is coded. Finally, a regrouped series of macroblocks constitutes a slice and each picture is composed of a given number of slices, for example 36 in the example described.

Figure 1:
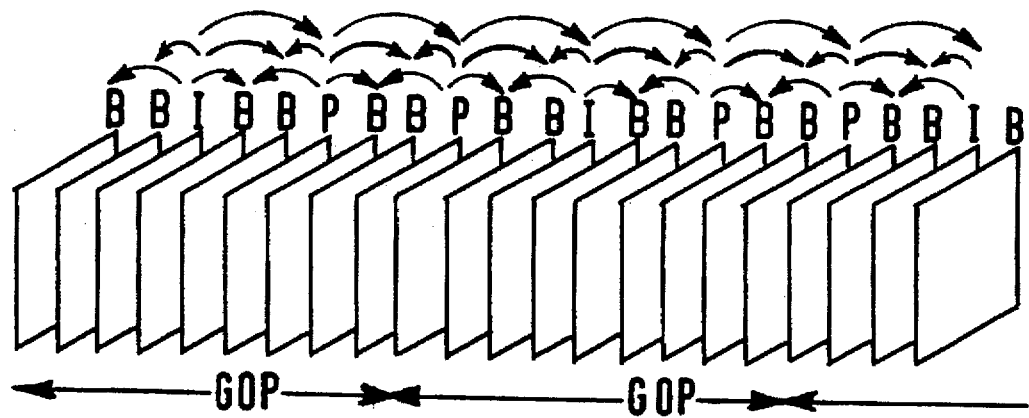
FIG. 1 shows an example of a sequence of pictures constituted by groups (GOP) of nine pictures, accompanied by the indication of their type I, P or B in accordance with the coding mode adopted for each of them.

The pictures (the assembly of digital signals corresponding thereto is also concisely referred to as such) in a stream of MPEG data are of three types in accordance with the coding mode to which they are subjected. The simplest are the pictures I ("Intra-frame coded pictures") in which all the macroblocks are coded independently of any other picture. Thus, if the transmission channel is modified or the bitrate is switched, such a picture of the type I is used for reconstituting the new information resulting from said modification at the decoding end. The pictures P ("Predictive coded pictures") constitute a second type of pictures which are predicted by unidirectional motion compensation based on a preceding (or possibly subsequent) picture (of the type I or of the type P itself) and which can thus only contain macroblocks of the type P or of the type I. Finally, the pictures B ("Bidirectionally predictive coded pictures"), predicted by bidirectional motion compensation based on a previous picture and a subsequent picture (of the type I and/or P) may indifferently contain macroblocks of the type I, P or B. Several associated pictures constitute a group of pictures referred to as GOP. As a picture of the type B which is to be predicted must use the picture P or I which follows it, it is evident that the natural order of restitution, after decoding, of the original sequence and the order of transmitting the pictures must be different: in a GOP the N pictures intended for transmission are placed in the order in which the decoder needs them for decoding the pictures I, P, B. The reorganization of these pictures in their natural order is effected only after decoding. FIG. 1 shows in a sequence of consecutive pictures an example of two GOPs of N=9 pictures (without the choice of N being limitative) with the indication of the type T=I, P or B of the picture, and of arrows showing from which picture(s) a picture P or B is predicted in the example shown.

A data stream comprises six information levels, each level including the lower level and some additional information components. The sequence of pictures (which begins with a header comprising the necessary information for decoding the sequence: starting code of the sequence, format, rhythm of the picture, rhythm of the bits, memory size, etc. and ends with an end of sequence code) corresponds to the highest level. At the lower level the group of pictures GOP comprises a header followed by an arbitrary number of pictures, with at least one picture I (although this is not indispensable, each GOP may be autonomous and may thus be decoded independently of any previous or subsequent picture, and the sequence of pictures I, P, B is generally periodical as in the example of FIG. 1).

Figure 2:
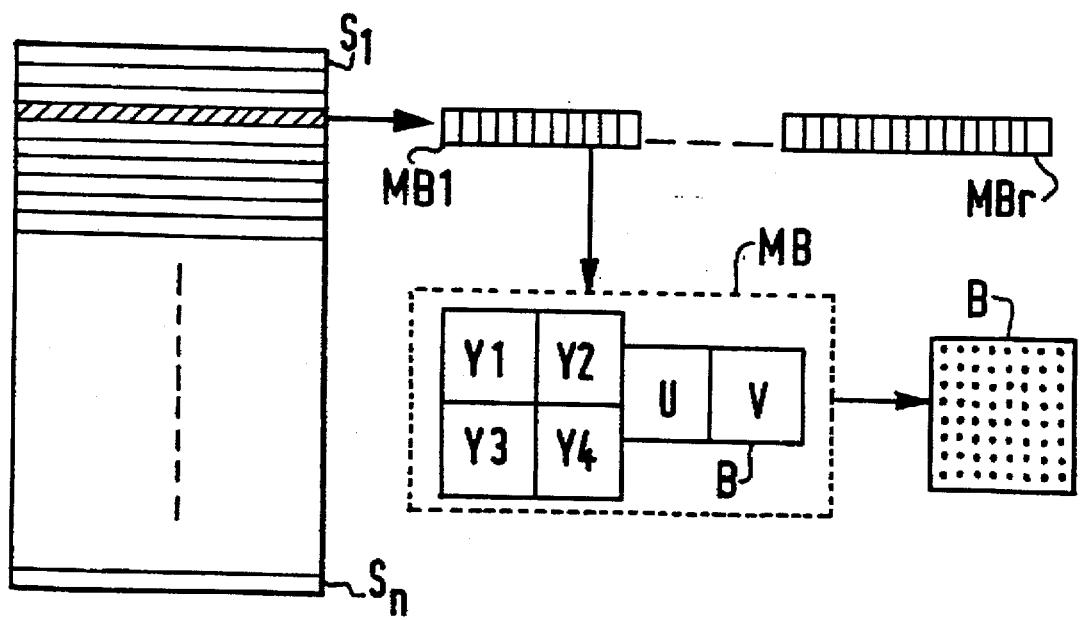
FIG. 2 is a simplified representation of a picture (the left-hand part of the Figure) subdivided into n slices $S_1$ to $S_n$, each slice comprising r macroblock $MB_1$ to $MB_r$, constituted by four luminance block $Y_1$ to $Y_4$ and two chrominance block U and V, which block B comprise 8×8 pixels in this case.

The still lower level, which corresponds to a picture as shown in FIG. 2, includes a given number n of picture slices $S_1$ to $S_n$ (here again, a header marks the start of the picture and contains the additional information: a code indicating the start of the picture, temporal reference of the picture, type of picture I, P or B, etc.). The still lower level corresponds to the picture slice and includes a given number of macroblocks MB (a header marks the start of the slice and contains the additional information: a code indicating the start of the slice, quantization step of the DCT coefficients, etc.). The still lower level corresponds to the macroblock MB comprising a given number of blocks, here 6 ($Y_1$, $Y_2$, $Y_3$, $Y_4$, U, V), preceded by a header which also contains some additional information such as the address of the macroblock (so as to know its position), its type (for indicating its coding mode: intra-frame coding, unidirectional prediction coding, bidirectional prediction coding), etc. The last level is that of the blocks B of 8×8 pixels in the present case.

After the description of features relating to the MPEG standard, the method of coding according to the invention and its application in the coding devices will now be described successively. As has been stated, said coding method has for its object to meet the situation in which the bitrate of the transmitted program is changed without any interruption of the transmission and broadcast service. The description of this method and of the corresponding coding devices will, however, be clearer if the restrictions imposed on the coding methods in relation to the envisaged application (adaptation to different bitrates) so that the decoding process will proceed correctly are first defined.

In practice, these restrictions are:

(a) a correct functioning in real time, i.e. with a constant delay between the input of the data to be coded in the coding device and the output of the data to be visualized at the output of the corresponding decoding device;

(b) a correct filling rate of the buffer memory present in this decoding device in order that this memory will not reach an overflow situation, i.e. an excess of received data, or an underflow situation;

(c) as the proposed ceding device should be compatible with the MPEG video standard, the whole coded picture should be present in the buffer memory of the decoding device before its effective decoding starts (an MPEG data stream is supposed to be decoded by a theoretical decoder which instantaneously reads each picture to be decoded in said buffer memory);

(d) the quality of the picture must remain as constant as possible without sudden changes in quality or periodicity appearance, and the bitrate control must be performed by appropriately attributing bits for this purpose.

With these precise details having been given, the coding method conventionally comprises a step of quantizing and coding signals which are representative of pictures (for example, variable-length coding after discrete cosine transform (per block) of said signals and after quantization of the blocks or macroblocks thus transformed), and a step of bitrate control of the coded signals (comprising, for example, in series, a sub-step of storing the variable-length coded data and a sub-step of modifying the quantization step as a function of the bitrate of said coded signals). It is essentially the latter sub-step which, in the implementation of the method according to the invention, is modified.

According to the invention, the step of bitrate control comprises different sub-steps, preceded by an operation of defining a value referred to as complexity of the current picture to be coded. This complexity, which defines an allocation of a certain number of bits to each successive picture, is a value which is representative of whether this current picture is suitable to be compressed in a considerable manner taking its contents into account. Here it is defined as a number of bits per picture proportional to the number of bits observed at the end of coding, for example as the product denoted X of said number of bits at the end of coding and the average quantization step for a picture. In a variant, it may be different in accordance with the type of picture: when the pictures are of the different type T, referred to as I, P or B, the complexity, denoted $X(T)$ is then defined as being equal to the product of the number of bits $S_i(T)$ observed at the end of coding of a picture of the same type T by the average quantization step $Q_i^m(T)$ for a picture of the same type T. The definition of the complexity may even be detailed in accordance with the type of picture: for the pictures of the type P, the complexity is chosen as being equal to the smallest of said products $(S_i(T) \times Q_i^m(T))$ and $(S_{i-1}(T) \times Q_{i-1}^m(T))$ computed for the current picture and for the or a preceding picture or a preceding picture of the same type P, respectively. In all cases it is preferable for the first pictures of a sequence whose number is insufficient to form a group (GOP) to impose initial values on said complexity.

With the complexity of the pictures thus being defined, the bitrate control step in accordance with the invention comprises the following sub-steps. First of all, for each given group of N successive pictures, a number of bits referred to as group profile is evaluated, having a value PROF which is proportional to the previously defined complexity, to the number N of pictures per group as well as to the bitrate, denoted by $R(t)$, as found at the coding output, and inversely proportional to the period of the pictures. Likewise as for the complexity, this value may be different dependent on the type of picture: designated by PROF(T), this group profile is then proportional to the expression $X(T) \times N \times R(T)$, with T=I, P or B. A particular example of the value of PROF(T) will be given hereinafter.

With this evaluation of a group profile having been determined for the entire duration of each group, the following three sub-steps are then performed for each new current picture to be coded: estimation of a number of bits NBNP per picture, correction of this estimation by evaluation of a corrected number CNNP, computation of a coefficient for modifying the quantization step and thus the bitrate, which is thus controlled.

The sub-step of estimating the value NBNP consists of determining for the current picture a number of bits which is proportional to the complexity already defined but also and particularly to a second value which is a number of bits NBSG (Number of Bits per Sliding GOP) determined per sliding group. In the present case a sliding group is a group of N pictures reconstituted at each new current picture by adding thereto (N−1) pictures which are adjacent and which have a position determined with respect thereto: the result is that the group, while including N pictures, shifts by one picture at each new picture, loses one picture at one extremity and acquires a picture at the other extremity. Throughout this description, each sliding group is considered to be composed for each new picture of this picture itself and of the (N−1) pictures which follow. This number NBSG may be equal or proportional to an expression of the type NBSG+PROF(T)−NBPP, where NBSG represents the preceding value of this quantity, PROF(T) has already been defined, and NBPP (Number of Bits Per Picture) represents the total number of bits per picture. As hereinbefore, a concrete estimation mode for NBNP will be given in greater detail in the description of an embodiment of the coding device according to the invention.

The sub-step of correcting this estimation consists of evaluating for the same current picture a corrected number of bits whose value, denoted CNNP (Corrected Number of bits for the Next Picture) is chosen from three values comprising the value NBNP before correction and two limits MIN(CN) and MAX(CN) indicating the fullness of the buffer memory for storing the coded signals. An example of the definition of these two limit values will be given hereinafter. The selection criterion for these three values thus compared is the selection of that value which is between the other two values.

Finally, the sub-step of computing the coefficient of modifying the quantization step ensures the determination for each macroblock of the current picture of a coefficient $Q_j$ (j being the rank of the macroblock in the sequence of successive macroblocks of the picture concerned) which is equal or proportional to the sum of a number of bits ISVB (Initial State of the Virtual Buffer) expressing the initial fullness of a buffer memory referred to as virtual memory and a complementary number which is equal to the number of bits PBAD (Picture Bits Already Delivered) already generated during coding of the (j31 1) preceding macroblocks of the picture and reduced by a correcting number of bits related to the values of j, the corrected number of bits CNNP and the number of macroblocks in the picture.

Each sub-step thus defined may be performed in a coding device by carrying out a series of corresponding instructions. Proceeding through the programme which regroups these instructions provides the possibility of successively effecting the different operations described above under the control of a microprocessor or a computer with which it constitutes the means for controlling the bitrate of said coding device, said operations being:

- the initial definition of the complexity of the picture in accordance with one of the previously described variants;
- the evaluation per given group of N pictures of a group profile which is valid throughout the duration of this group;
- and finally for each new current picture, the estimation of allocation of bits NBNP, the correction of this allocation of bits as a function of the fullness of the buffer memory for storing the coded signals, and the final modification of the quantization step of each macroblock.

Under the hypothesis that the coding device is this time implemented with the aid of wired electronic modules, the corresponding embodiment will be described with reference to FIG. 3. This embodiment of the coding device shown in FIG. 3 has a coding channel comprising, in series, a discrete cosine transform circuit 1 (DCT), a quantizing circuit 2 (denoted Q), and a variable-length coding circuit 3 (VLC). The DCT transform circuit 1 receives, via a subtracter to be mentioned below, digital signals which correspond to the input video signals of the coding device (obtained by the difference between these input signals and the predicted signals which are present at the other input of the subtracter) and are available in the form of blocks of 8×8 pixels in this case. This circuit 1 converts these signal blocks into block of 8×8 coefficients, the fast of which represents the average value of the grey levels of the block considered and the sixty-three others represent the different spatial frequencies in this block. As the information conveyed by the pictures is concentrated in the low-frequency range, a considerable number of these coefficients, those corresponding to the highest frequencies, is often zero. The DCT transform thus ensures a considerable reduction of the number of coefficients to be transmitted per block.

The circuit 2 quantizes each non-zero output coefficient of the DCT transform circuit 1 in accordance with a quantization step which is higher for its high frequencies than for its low frequencies so as to take the fact into account that the high spatial frequencies are less perceptible to the human eye. While sacrificing the least visible coefficients, this less precise quantization provides the possibility of reducing the bitrate of the signals (although this is detrimental to the precision of reconstituting these coefficients during decoding).

The sequence of coefficients thus quantized which in practice comprises a considerable number of zeros, particularly in the high-frequency range, is applied to the VLC coding circuit 3 which reduces the bitrate once more by assigning the shortest code words to coding of the most frequent symbols and the longest words to coding of the rarest symbols.

The coding channel thus constituted (DCT transform, Q quantization, VLC coding) reduces the spatial redundance of the input signals, but the data compression obtained is in a ratio which cannot exceed the value of about 10. A higher compression may be obtained if the temporal redundance of the input signals is taken into account, (in a sequence of animated pictures the successive pictures resemble each other, the differences between them being only due to motion). Only these differences are then transmitted after having determined them by subtracting a predicted image from the current image, which predicted image is reconstituted on the basis of a preceding current image by taking the intermitting motion into account. More particularly, a good prediction of the picture may be obtained by means of estimation and compensation of the motion of mobile objects. To this end, the coding device of FIG. 3 associates a prediction channel with the coding channel, which prediction channel comprises, in series, an inverse quantizing circuit 4 (which inverse quantization is denoted $Q^{-1}$), an inverse discrete cosine transform circuit 5 (denoted $DCT^{-1}$), an adder 6, a memory 7, a circuit 8 for motion compensation based on the uncompensated picture stored in said memory, and a subtracter 9 forming the difference between the input signals and the predicted signals available at the output of the circuit 8 (which predicted signals are also applied to a second input of the adder 6) so that only the difference between these signals is sent to the coding channel and treated therein while taking the intermittent motion between the predicted picture (based on the preceding picture) and the input picture (or current picture) into account.

Figure 3:
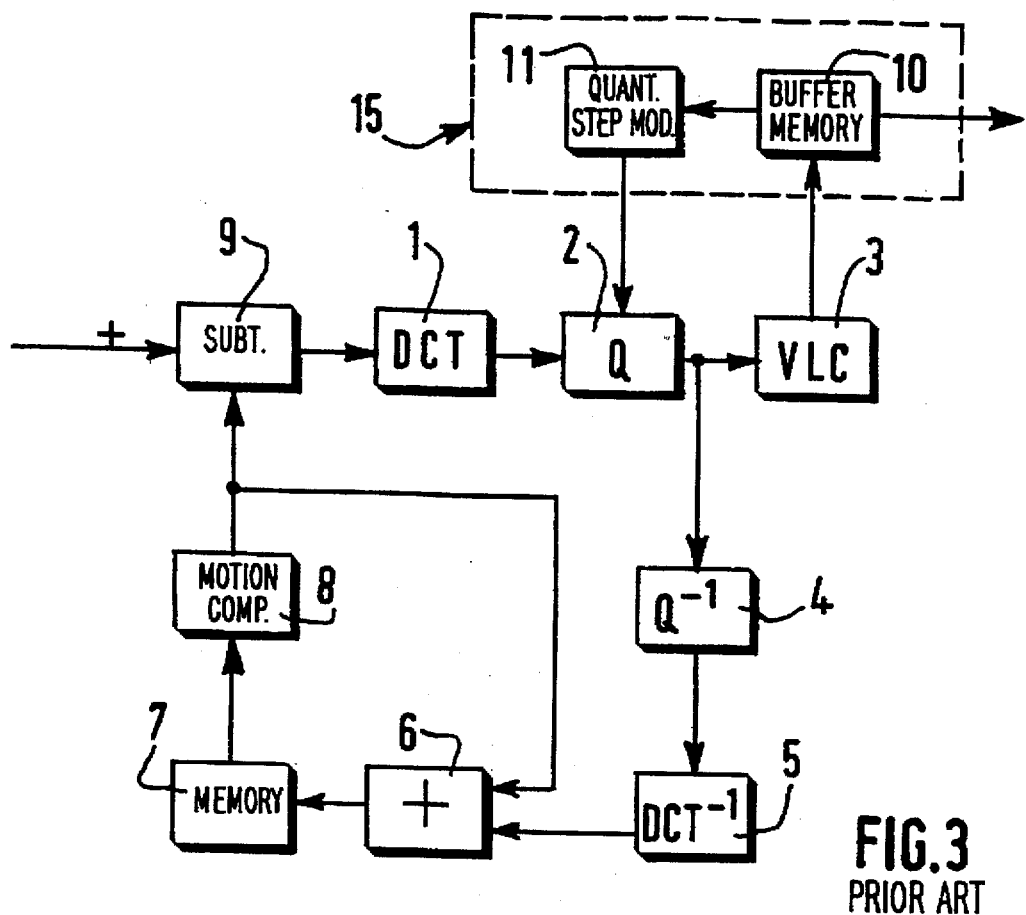
FIG. 3 shows the general structure of a variable-length coding device of the conventional type.

The coding device shown in FIG. 3 also comprises a bitrate control sub-assembly 15 which conventionally comprises a buffer memory 10 arranged at the output of the variable-length coding circuit 3 and a device 11 for modifying the quantization step. As a function of the fullness of the buffer memory, this device 11 modifies the quantization step used in the circuit 2 by way of a feedback process for obtaining the most constant possible bitrate at the output of this memory.

Figure 4:
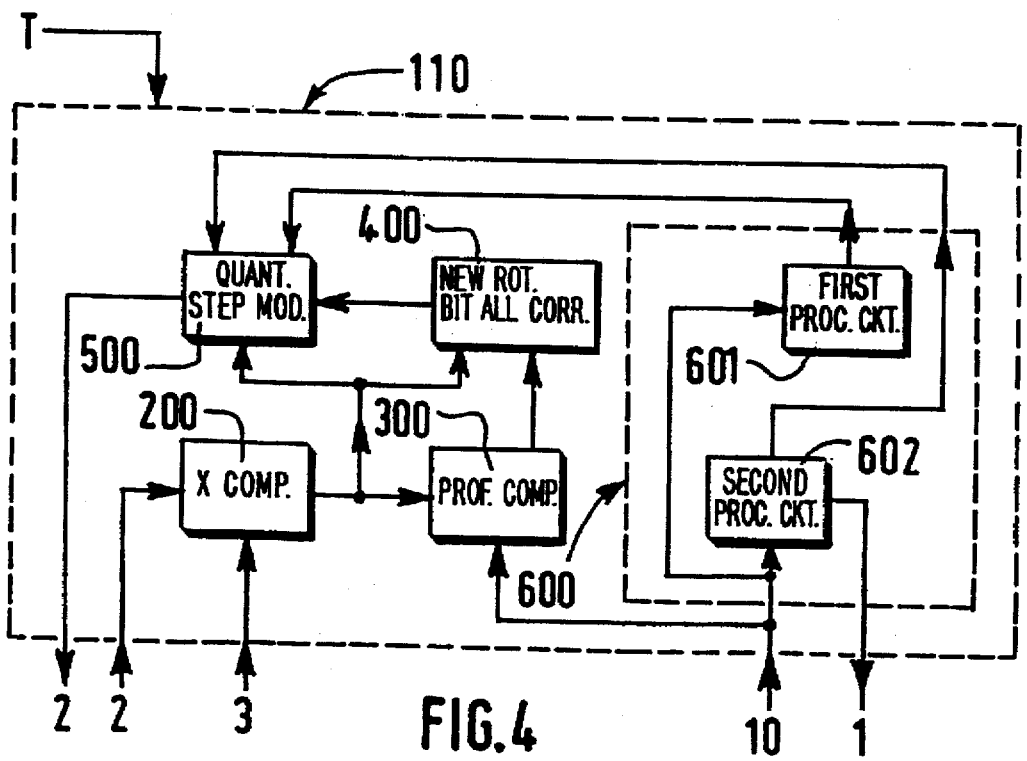
FIG. 4 shows an embodiment in such a coding device of a sub-assembly for bitrate control modified in accordance with the present invention.

The invention has for its object to realise a coding method as described hereinbefore in such a coding device, which method effectively meets the situation in which the bitrate of the transmitted program is changed without any interruption of the transmission and broadcast service. To perform this coding method according to the invention, the bitrate control sub-assembly of the coding device of FIG. 3 is modified and comprises, instead of device 11, a device 110 for modifying the quantization step, which is shown in FIG. 4. This device 110 comprises different stages 200 to 500 which will now be successively described in detail, as well as an auxiliary stage 600 in an improved variant of this device which will be described thereafter.

The device 110 for modifying the quantization step shown in FIG. 4 comprises a stage 200 for allocating the bits for each picture to be coded. This allocation of a certain number of bits to each picture is effected by estimating its complexity. This complexity may be estimated in a different manner dependent on whether the current picture is of the type I, P or B. As is shown in FIG. 4, this type T of the current picture is received by the device 110 and supplied by circuits (not shown because they are not within the scope of the invention) preceding the coding device. The global complexity of the picture, denoted X(T) is given by the following expression (1) or (2):

(a) if T=I or B, then:

$$X(T) = S_f(T) \cdot Q_i^m(T) \qquad (1)$$

(b) if T=P, then:

$$X(T)=MIN[(S_i(T) \cdot Q_i^m(T)),(S_{i-1}(T) \cdot Q_{i-1}^m(T))] \quad (2)$$

In these expressions, $S_i(T)$ and $S_{i-1}(T)$ denote the numbers of bits resulting from coding the current picture and the preceding picture of the same type, respectively, and $Q_{i-1}^m(T)$, $Q_i^m(T)$ denote the average quantization steps corresponding to each of these preceding and current pictures, respectively, computed by taking the average values of the quantization steps corresponding to coding all the macroblocks into account. For the pictures of the type P, the smallest of the two last complexity values is taken as the complexity value, which provides the possibility of attenuating the effects of scene changes on the quality of the picture (the first picture of the type P which follows a change of scenes always has a higher and non-representative complexity value). If the distinction between pictures P and pictures I or B is not taken into account, the expression (1) is chosen for all the cases as the estimated complexity value. For the first pictures initial values of X(.) must be chosen and the realised tests have contributed to using the following values in numbers of bits, independent of the bitrate:

$X_o(I)=10.000.000$
$X_o(P)=3.500.000$
$X_o(B)=1.200.000$

Figure 5:
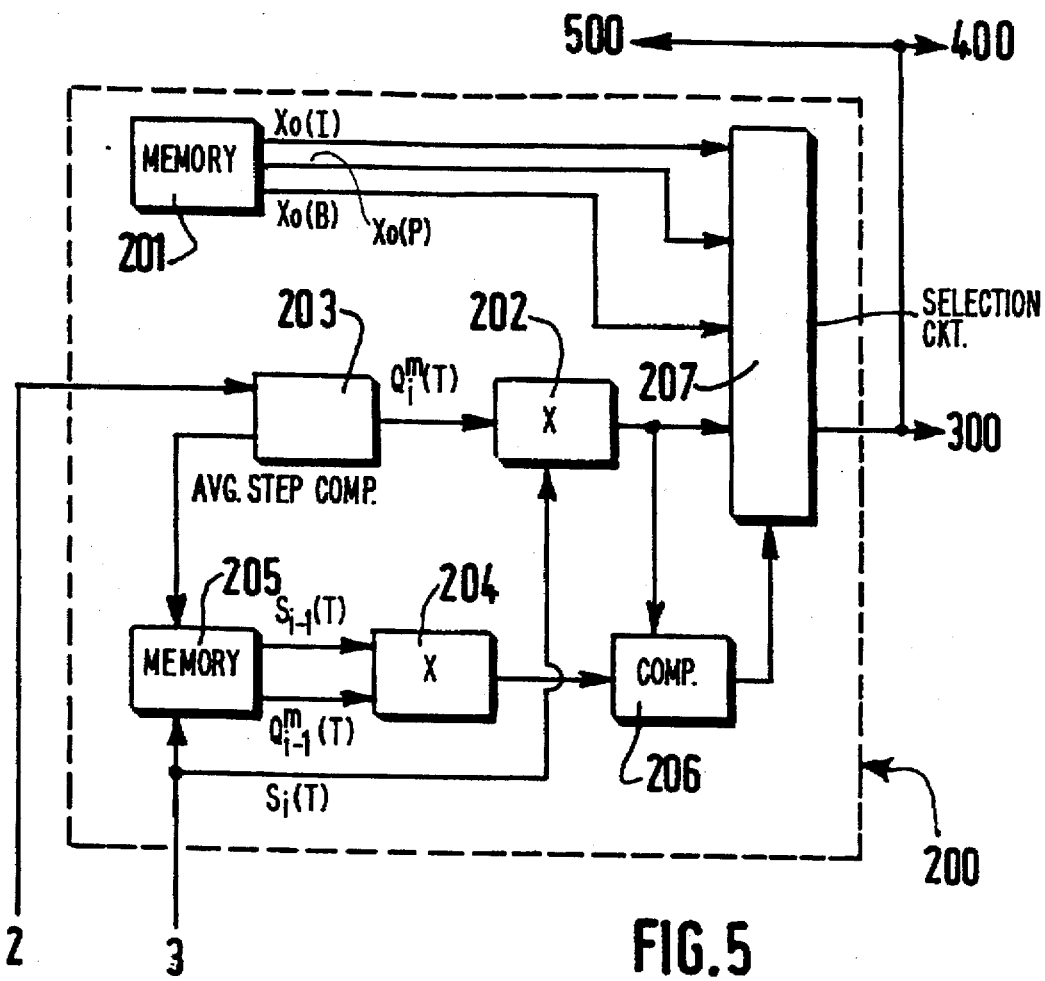
FIGS. 5, 6, 10, 11 show embodiments of four stages of this sub-assembly for bitrate control as shown in FIG. 4.

This operation of estimating the complexity is realised in all cases by the stage 200. As the embodiment in FIG. 5 shows, this stage 200 comprises a memory 201 containing the initialization values $X_o(I)$, $X_o(P)$, $X_o(B)$. A first multiplication circuit 202 receives the values $S_i(T)$ and $Q_i^m(T)$: the number of bits $S_i(T)$ is directly supplied by the output of the variable-length coding circuit 3 and the average quantization step $Q_i^m(T)$ is supplied by a circuit 203 for computing this average step on the basis of the real quantization steps of the macroblocks which are transmitted by the quantizing circuit 2. A second multiplication circuit 204 receives the values $S_{i-1}(T)$ and $Q_{i-1}^m(T)$ corresponding to the preceding picture of the same type T as the current image and stored temporarily in a memory 205 which has received these values from the circuits 3 and 203 as hereinbefore. Only when T=P, a comparator 206 makes a comparison between the products $S_i \cdot Q_i^m$ and $S_{i-1} \cdot Q_{i-1}^m$ and selects the smallest of the two compared values, as indicated by means of the term MIN[.] in expression (2). A selection circuit 207 having five inputs receives the three outputs of the memory 201, that of the multiplication circuit 202 and of the comparator 206 and dependent on whether the picture is of the type T and is the first or not the first of the sequence, supplies one of the signals present at these five inputs. This output signal of the circuit 207, which constitutes that of the stage 200, is thus the following:

(a) the initial value $X_o(I)$, or $X_o(P)$, or $X_o(B)$ if in the sequence of pictures the picture is the first of the type concerned;

(b) the output signal of the first multiplication circuit 202, if the picture in the sequence of pictures is no longer the first of the type concerned and if T=I or B;

(c) the output signal of the comparator 206, if the picture in the sequence of picture is no longer the first of the type concerned and if T=P.

If one does not make a distinction between the pictures P and the pictures I or B, the multiplication circuit 204 and the memory 205 are not provided and the selection circuit 207 then has only four inputs to select only one signal out of four, either one of the three outputs of the first memory 201, or the output of the first multiplication circuit 202.

Figure 6:
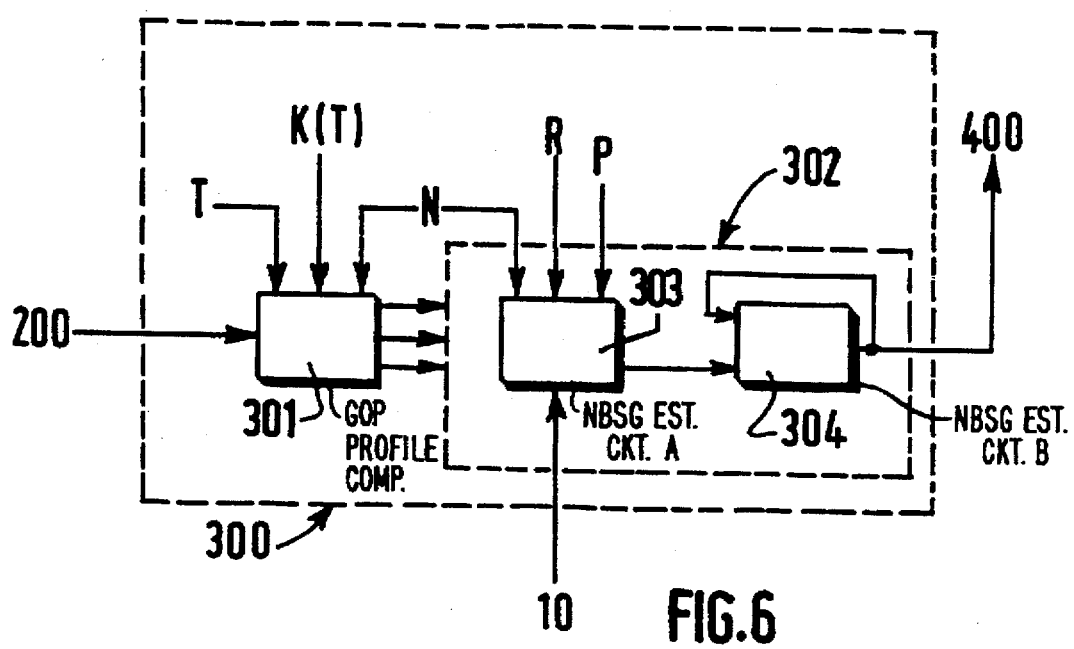

The device 110 for modifying the quantization step also comprises, in series with the stage 200 as shown in FIG. 4, a stage 300 for allocating the bits for each group of pictures. This stage 300, which is shown in FIG. 6, comprises a circuit 301 for computing the GOP profile. This GOP profile, which consists of a set of values (one per type of picture T) which are determined at the start of the GOP and are not modified as long as a new GOP does not present itself, is given by expression (3):

$$PROF(T)=(X(T)/K(T)) \cdot (NR(t)/P)/(\Sigma_k N(k) \cdot X(k)/K(k)) \quad (3)$$

In this expression:

T=I, P or B;

X(T) has already been defined;

K(T) is a constant defined once for all cases and, in the example described, $K(I)=K(P)=1$ and $K(B)=1.4$;

N=number of pictures per GOP (for example, in the example described, N=12, N(I)=1, N(P)=5 and N(B)=6);

R(t)=instantaneous bitrate at the output of the buffer memory 10;

P=period of the pictures;

under the symbol $\Sigma$, k=T successively takes k=I, k=P, k=B;

N(k), in which k is successively I, P, B, represents the number of pictures of the type I, P or B (respectively) in the GOP concerned.

The three values of PROF(T) thus obtained at the output of the circuit 301 are then supplied in the stage 300 to a circuit 302 for estimating (or allocating) a number of bits per sliding GOP, which circuit is subdivided into two circuits 303 and 304, as will be described below. Two situations may then arise: either the bitrate R remains constant at the output of the coding device, or a command to change the bitrate is given for passing from a bitrate $R_1$ to a bitrate $R_2$. In this respect it may be recalled that, in accordance with the MPEG standard, a space is periodically reserved for information about the bitrate in the headers of the sequence of the digital signal stream. In this header, one either indicates the value of the bitrate R, or in accordance with a variant, one indicates that this bitrate is variable and its value is only precisely indicated in a second area situated behind this reserved space. A command for switching the bitrate at the instant t=to involves the modification of R either in all the headers of the sequence after to, or in all these second areas situated behind the reserved space, until the bitrate is switched again, and so forth. It will be supposed that this command of changing the bitrate from $R_1$ to $R_2$ may be taken into account by the coding device only at an instant t=to corresponding to the start of a real GOP of the data stream (even if the order is before this start of the real GOP, it is not validated until this instant $t_o$). For this GOP which starts, the number of bits is then estimated on the basis of the hypothesis that the fullness of the buffer memory 10 of the coding device must be as small as possible at the start of each real GOP. This hypothesis is justified by the fact that coding of a real GOP commences with intra-frame coding of a picture (of the type I) and that such a picture requires a considerable part of the global allocation of said GOP.

In the first situation, in which the bitrate R is constant, this global allocation, or number of allocated bits, is given by the following expression (4) (the abbreviation NBRG designating this value stands for Number of Bits per Real GOP):

$$NBRG_c=(NR(t)/P)+WBF_c-F_c(GOPST) \quad (4)$$

in which

N, R(t), P have already been defined;

WBF$_c$ (Wished Buffer Fullness) represents, in numbers of bits, the desired fullness at a Constant bitrate for the buffer memory 10 at the start of each real GOP, i.e. at the start of the first active slice of its first picture;

F$_e$(GOPST) indicates, in numbers of bits, the real fullness of the buffer memory 10 at the start of said real GOP (GOPST: GOP Start) and is provided by said memory.

In the second situation, in which the bitrate passes from a value R$_1$ to a value R$_2$ (at the instant t=t$_0$ and at the start of a real GOP) the global allocation NBRG$_v$ (Number of Bits per Real GOP, at a variable bitrate) of this real GOP is now given by the following expression (5):

$$NBRG_v = (NR_2/P) + WBF_v - F_e(GOPST) + (R_1 31\ R_2)D_b \qquad (5)$$

in which:

WBF$_v$ now represents the desired fullness, taking the change of bitrate into account, for the buffer memory 10 at the start of each real GOP;

D$_b$, in the supplementary term (R$_1$–R$_2$) D$_b$, indicates the constant delay between the instant of entry of the data (coded in the VLC coding circuit 3) into the buffer memory 10 and the instant when the corresponding decoded data leave the buffer memory in the decoder in the case where the coding circuit and the corresponding decoding circuit are directly connected to each other.

As may be noted, this delay D$_b$ is the sum, which is maintained constant, of the delays introduced by the buffer memories of the coding device and the corresponding decoding device, independent of the real duration of the variable delay, due to the transmission and of the supplementary delay added to the latter at the side of the decoding device for compensating this variable character (it will be noted that with R=R$_1$=R$_2$ in the general expression (5), the expression (4) of NBRG$_c$ at a constant bitrate is found again).

As is desirable that the fullness of the buffer memory 10 at the start of a GOP is as small as possible, WBF, the wished buffer fullness, is defined by the following expression (6):

$$WBF = F_{min}(t) + 4R(t)/(P \times NBSP) \qquad (6)$$

In this expression, NBSP stands for NumBer of Slices per Picture and F$_{min}$(t) is the theoretical low limit of the fullness of the buffer memory of the coding device in order that the buffer memory of the corresponding decoding device does not overflow (the overflow situation as mentioned hereinbefore).

This limit F$_{min}$(t), designated in the form of a function of time t because it is susceptible to variation at each switch of the bitrate, could take, for example a constant value which is proportional to each desired bitrate. More generally, F$_{min}$(t) is determined with the aid of a circuit 305 for computing the security limits of the memory, and as will now be indicated. If e(t) is referred to as the function of time representing the instantaneous bitrate at the input of the buffer memory 10 (i.e. at the output of the variable-length coding circuit 3), the instantaneous fullness (at an instant t) of this buffer memory 10 of the coding device, denoted by EBF(t) (Encoder Buffer Fullness), is equal to the difference between the bitrates at the output and at the input of the buffer memory 10 and is thus given by the expression (7):

$$EBF(t) \int_0^t e(x) \cdot dx - \int_0^t R(x) \cdot dx \qquad (7)$$

in which R(.) is the function expressing the instantaneous bitrate at the output of the buffer memory 10 (it is supposed that this memory is empty at the origin of time t=0 and that e(t)=R(t)=0 for every negative t).

Figure 7:
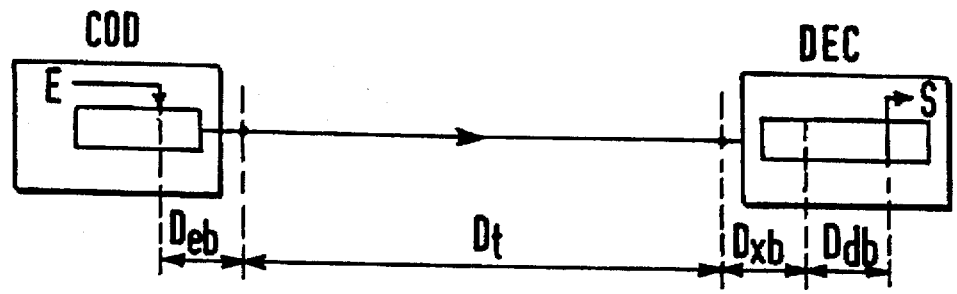
FIG. 7 illustrates the different delays introduced by the memories of the coding and decoding devices.

Moreover, to meet the restriction (a) cited hereinbefore (correct functioning in real time) it should be supposed that there is a constant delay D between the input of the data in the buffer memory 10 of the coding device and the start of their decoding. As indicated in FIG. 7, this delay D may be broken down into four distinct delays in accordance with the following expression (8):

$$D = D_{eb} + D_t + D_{xb} + D_{db} \qquad (8)$$

in which:

D$_{eb}$ represents at the coding side (COD) the delay due to the buffer memory 10 (Encoder Buffer) of the coding device (the point E designates the point of entry of the data into said memory);

D$_t$ represents the delay due to the transmission and to all associated operations (such as multiplexing or demultiplexing);

D$_{xb}$ represents at the decoding side (DEC) a delay for compensating the variations of D$_t$(thus, permanently, D$_t$+D$_{xb}$=constant);

D$_{db}$ represents at the decoding side the delay due to the buffer memory (Decoder Buffer) provided before the variable-length decoding circuit (it may here be noted that the distinction between D$_{xb}$ and D$_{db}$ is purely theoretical because these delays are introduced by the same memory).

Since D$_t$+D$_{xb}$=constant, one should also have the following equation (9) in order that the decoding is regular (or without seams, also referred to as seamless decoding):

$$D_{eb} + D_{db} = \text{constant } (=D_b) + tm \qquad (9)$$

This parameter D$_b$ defined above is fixed for a given coding device by this device and subsequently imposed on the corresponding decoding device.

Similarly as the instantaneous fullness EBF(t) of the buffer memory 10 has been determined above, it is also possible to define the instantaneous fullness DBF(t) (Decoder Buffer Fullness) of the decoding memory which is present in the decoding device. Similarly as for the fullness EBF(t), this fullness DBF(t) is determined from the difference between the instantaneous bitrates at the input and output of the decoding memory (the point S in FIG. 7 designates the point of exit of the data of said memory) in accordance with expression (10):

$$DBF(t+D) = \int_0^{t+D} R(x - D_t - D_{xb}) \cdot dx - \int_0^{t+D} d(x) \cdot dx \qquad (10)$$

In this expression, d(x) designates the instantaneous bitrate at the output of the decoding memory and R(x–D$_t$–D$_{xb}$), which is the instantaneous bitrate at the input of the same memory, is equal to that at the output of the buffer memory 10 shifted in time D$_t$+D$_{xb}$ (these delays are those for transmission and compensation as defined above).

As $R(t)=0$ for $t<0$, it thus holds that:

$$\int_0^{t+D} R(x-D_t-D_{xb}) = \int_{D_t+D_{xb}}^{t+D} R(x-D_t-D_{xb})$$

and as $d(t)=0$ for $t<D$, it also holds that:

$$\int_0^{t+D} d(x) \cdot dx = \int_0^{t+D} d(x) \cdot dx$$

which leads to:

$$DBF(t+D) = \int_{D_t+D_{xb}}^{t+D} R(x) - D_t - D_{xb}) \cdot dx - \int_D^{t+D} d(x) \cdot dx \quad (11)$$

This expression is equivalent to:

$$DBF(t+D) = \int_0^{t+D_b} R(x) \cdot dx - \int_0^{t} d(x+D) \cdot dx \quad (12)$$

As the way in which the decoding device instantaneously works is not exactly known, it may be supposed that:

$$d(t+D)=e(t) \quad (13)$$

The integrals for a complete picture period of each of these two values are equal (the number of bits corresponding to the coded picture). This leads to expression (14):

$$DBF(t+D) = \int_0^{t+D_b} R(x) \cdot dx - \int_0^{t} e(x) \cdot dx \quad (14)$$

which may also be written in the form of expression (15):

$$DBF(t+D) = \int_t^{t+D_b} R(x) \cdot dx - EBF(t) \quad (15)$$

This expression (15) is only exact when t corresponds to the instant denoted $t_{end}$ when coding of the current decoded picture has been realised. Subject to this hypothesis and that according to which all the bits corresponding to a picture are supposed to be instantaneously extracted from the coding memory and are present in the memory for decoding when decoding of this picture begins, the expression (12) will be written as follows:

$$DBF(t+D) = \int_0^{t+D_b} R(x) \cdot dx - \int_0^{t_{end}} e(x) \cdot dx \quad (16)$$

(t being an arbitrary instant taken in the interval $[(t_{end}-1/P), t_{end}]$ and P designating the picture frequency), or:

$$DBF(t+D) = \int_{t_{end}}^{t+D_b} R(x) \cdot dx - EBF(t_{end}) \quad (17)$$

For a correct operation of the decoding device, the restriction which should be respected at the decoding end is given by the following expression (18):

$$0 \leq DBF(t) \leq DBPS \text{ (whatever the value of t)} \quad (18)$$

in which DBPS (Decoder Buffer Physical Size) denotes the real (or physical) size of the decoding memory. For the first condition $DBF(t)>0$ and taking expression (17) into account, this leads to:

$$EBF(t_{end}) \leq \int_{t_{end}}^{t+D_b} R(x) \cdot dx \quad (19)$$

whatever the value of t in the interval defined above. By taking the second condition $DBF(t)<DBPS$ and expression (17) into account, the result then is:

$$DBPS \geq \int_{t_{end}}^{t+D_b} R(x) \cdot dx - EBF(t_{end}) \quad (20)$$

or:

$$EBF(t_{end}) \geq \int_{t_{end}}^{t+D_b} R(x) \cdot dx - DBPS \quad (21)$$

whatever the value of t in the same interval as before. Based on these conditions and on the fact that R is a positive function of time, this leads to:

$$EBF(t_{end}) \leq \int_{t_{end}}^{t_{end}-1/P+D_b} R(x) \cdot dx \quad (22)$$

$$EBF(t_{end}) \geq \int_{t_{end}}^{t_{end}+D_b} R(x) \cdot dx - DBPS \quad (23)$$

These two last expressions (22) and (23) show that for a correct decoding (effectively ensuring that the fullness of the decoding memory remains between the limits (0, DBPS)) it is sufficient that the two restrictions imposed upstream on the fullness of the buffer memory of the coding device should be satisfactory simply at the end of each picture period.

A variant consists of the requirement that these restrictions should be satisfactory at any moment. The expressions (22) and (23) will then become the expressions (24) and (25):

$$EBF(t) \leq \int_t^{t+D_b-1/p} R(x) \cdot dx \quad (24)$$

$$EBF(t) \geq MAX\left(0, \int_0^{t+D_b} R(x) \cdot dx - DBPS\right) \quad (25)$$

The terms at the right of the symbols $\leq$ and $\geq$ in these expressions (24) and (25) may be referred to as $F_{max}(t)$ and $F_{min}(t)$, respectively (in expression (25) Max is used to select the value "0" as the lower limit if $$\int_0^{t+Db} R(x) \cdot dx - DBPS$$

is negative).

This limit $F_{min}(t)$ is the one appearing in expression (6) and the one which one wants to determine. It is to be noted that $F_{min}(t)$ varies when switching the bitrate and that its determination at an instant $t_o$ implies that the values by for the function R in the interval $[t_o, t_o+D_b]$ should be known. As a result, in the case of switchable bitrates, the limits concretely fixed to EBF(t) to permit correct decoding should start changing before the effective switching of the transmission bitrate, at an instant situated at a time interval $D_b$ before this instant of switching the transmission bitrate.

If it is supposed for bitrates which are switchable from a first to a second value that the transmission bitrate has an initial value $R(t)=R_1$ whatever $t<t_o+D_b$, and a final value (after switching) $R(t)=R_2$, whatever $t \geq t_o+D_b$, the lower limit of the fullness $EBF(t)$ of the buffer memory 10 of the coding device is defined:

(a) for every $t<t_o$, by the expression (26):

$$F_{min}(t)=MAX(0, (D_b R_1 - DBPS)) \quad (26)$$

(b) for every $t \geq t_o+D_b$, by the expression (27):

$$F_{min}(t)=MAX(0, (D_b R_2 - DBPS)) \quad (27)$$

(c) for every $t$ within the interval $[t_o, t_o+D_b]$, by the expression (28) representing, during this transition time of one bitrate to another, a linear variation between the values $F_{min}(t)$ obtained in the two previous cases (a), (b):

$$F_{min}(t)=MAX(0, (D_b R_1+(t-t_o)(R_2-R_1) - DBPS)) \quad (28)$$

Similarly, the upper limit of this fullness $EBF(t)$ is defined as follows:

(a) for every $t<t_o$, by the expression (29):

$$F_{max}(t)=(D_b-1/P) \cdot R_1 \quad (29)$$

(b) for every $t \geq t_o+D_b$, by the expression (30):

$$F_{max}(t)=(D_b-1/P) \cdot R_2 \quad (30)$$

(c) for every $t$ in the interval $[t_o, t_o+D_b]$, by the expression (31) representing, during this time of transition of one bitrate to another, a linear variation between the values $F_{max}(t)$ obtained in the two previous cases (a), (b):

$$F_{max}(t)=(D_b-1/P) \cdot R_1+(t-t_o-1/P) \cdot (R_2-R_1) \quad (31)$$

If $F_{sup}(t)$ is referred to as the function of time equal to $$\int_t^{t+Db} R(x) \cdot dx,$$

this limit, in the same case of the bitrates switchable between $R_1$ and $R_2$, is also defined as follows:

(a) for every $t<t_o$, by the expression (32):

$$F_{sup}(t)=D_b R_1 \quad (32)$$

(b) for every $t \geq t_o+D_b$, by the expression (33):

$$F_{sup}(t)=D_b R_2 \quad (33)$$

(c) for every $t$ in the interval $[t_o, t_o+D_b]$, by the expression (34) representing, during the time of transition from one bitrate to another, a similar linear variation between the values $F_{sup}(t)$ obtained in the two previous cases (a), (b):

$$F_{sup}(t)=D_b R_1+(t-t_o) \cdot (R_2-R_1) \quad (34)$$

It will here be noted that the difference $F_{sup}(t)-F_{min}(t)$, designated by the reference DBES (Decoder Buffer Effective Size), represents the pan of the decoding memory (the real size DBPS) which is effectively used.

Figure 8:
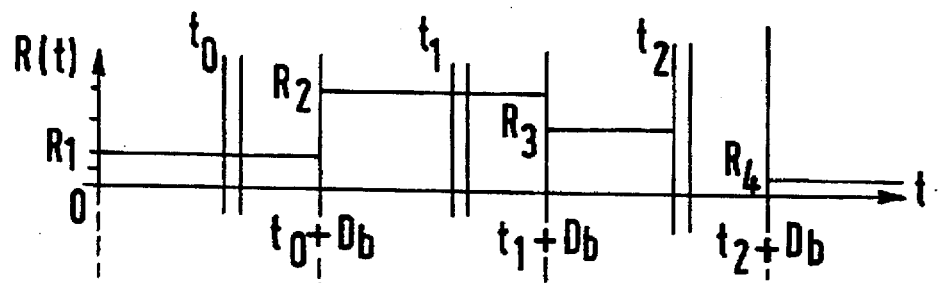
FIG. 8 shows different bitrate values at the output of the buffer memory of the coding device and FIG. 9 shows the corresponding variation limits of the fullness of this buffer memory.
Figure 9:
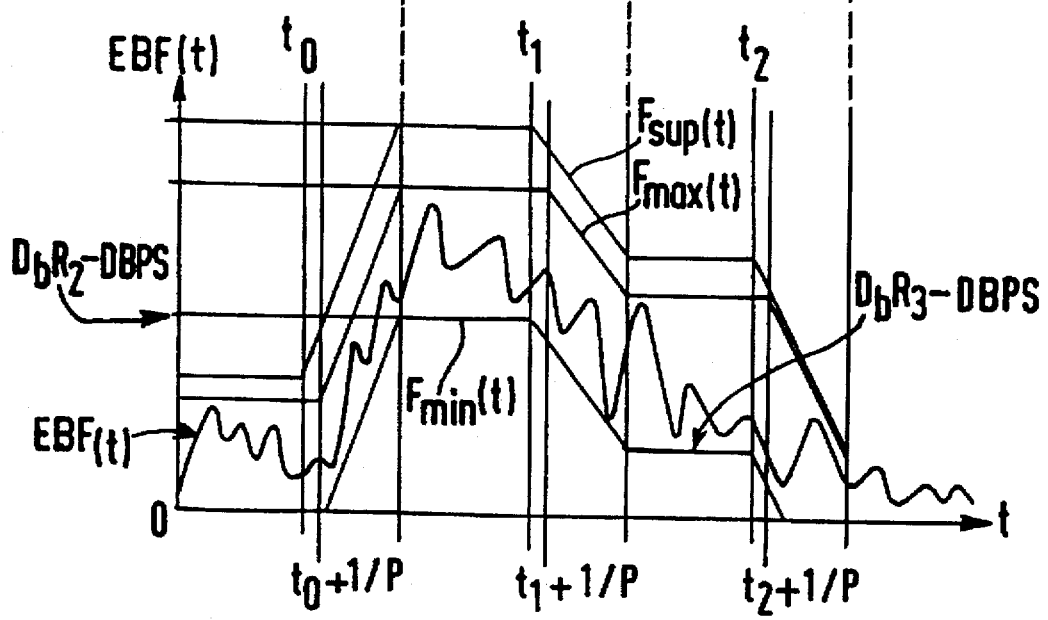
Figure 10:
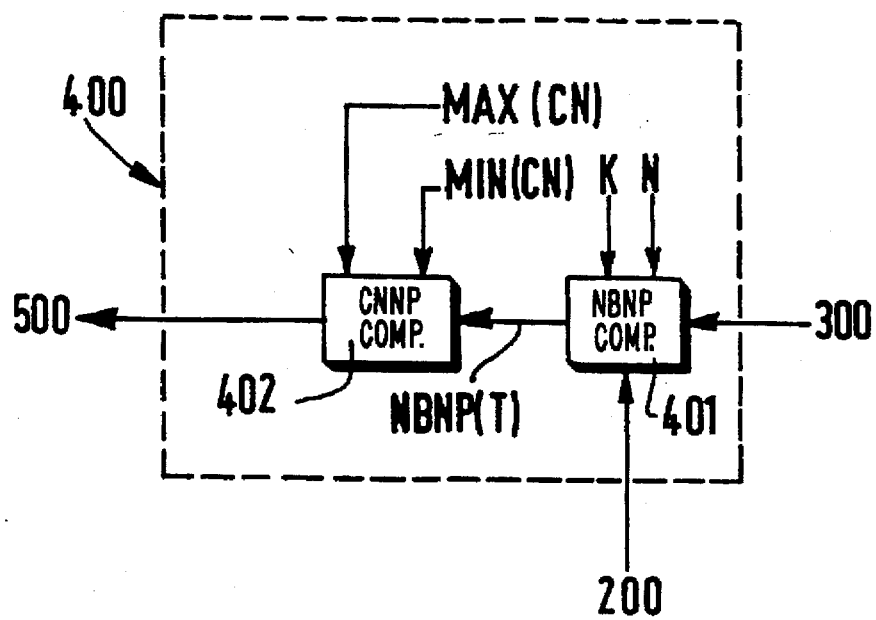
Figure 11:
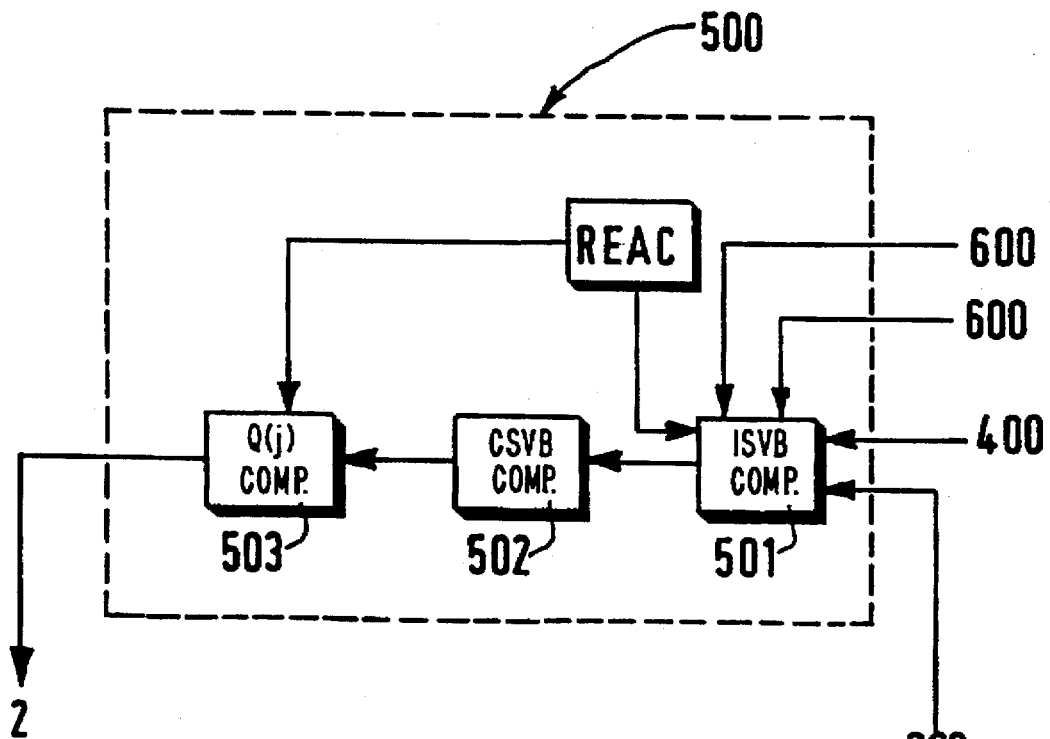

FIGS. 8 and 9 illustrate the variations of these limits $F_{min}(t)$, $F_{max}(t)$, $F_{sup}(t)$ for switchable bitrates. In a reference comprising axes $(t, R(t))$, FIG. 8 shows four bitrates $R_1$, $R_2$, $R_3$, $R_4$ successively imposed at the output of the buffer memory 10 and $t_0$, $t_1$, $t_2$ are referred to as the instants when a bitrate switching order (from $R_1$ to $R_2$, from $R_2$ to $R_3$, and from $R_3$ to $R_4$, respectively) occurs. In a reference comprising axes $(t, EBF(t))$ and in conformity with FIG. 8 as far as the instants on the time axis are concerned, FIG. 9 shows the variations of the real fullness $EBF(t)$ of the buffer memory 10 between the limits $F_{min}(t)$ and $F_{max}(t)$ defined for each bitrate value (y even during the transition or switching periods when the variation of these limits is linear from one degree limit to the next) taking the different imposed bitrates $R_1$, $R_2$, $R_3$, etc. into account.

In the described example of a coder which is compatible with the "MPEG2 standard, main profile" (it is known that this standard for compressing data is currently characterized in that three profiles, which are themselves subdivided into levels, are used which reflect the level of complexity of treating said data in the form of parameters such as the size or the period of the pictures, the number of pixels per second, the bitrate, etc.), the bitrate at the output of the buffer memory 10 is not higher than 15 Mbits/second and the real size of the decoding memory is 1835008 bits. Tests have been performed, for example with $D_b=240$ ms (i.e. six picture periods at 50 Hz) and the limits $F_{min}(t)$ and $F_{max}(t)$ of $EBF(t)$ are then as follows for several examples of bitrates:

(a) 2 Mbit/s: 0 and 400.000 bits;
(b) 3.5 Mbit/s: 0 and 700,000 bits;
(c) 6 Mbit/s: 0 and 1.200.000 bits;
(d) 7.65 Mbit/s: 992 bits and 1.530.000 bits;
(e) 15 Mbit/s: 1.764.992 bits and 3.000.000 bits.

In fact, a too low value of $D_b$ could lead to a real size value of the buffer memory 10 which would be lower at low bitrates (which would affect the picture quality) and a value of the delay $D_b=280$ ms (i.e. seven picture periods at 50 Hz) is rather chosen and the limits $F_{min}(t)$, $F_{max}(t)$ will then be, respectively, for the same examples of bitrates:

(a) 2 Mbit/s: 0 and 480.000 bits;
(b) 3.5 Mbit/s: 0 and 840.000 bits;
(c) 6 Mbit/s: 0 and 1.440.000 bits;
(d) 7.65 Mbit/s: 1792 bits and 1.574.400 bits;
(e) 15 Mbit/s: 2.364.992 and 3.600.000 bits.

Finally, an interesting solution is a coding device in which the parameter $D_b$ is adjustable in such a way that the other parameters which are dependent on $D_b$ are also automatically adjusted.

With the mode of determining $F_{min}(t)$ thus being defined irrespective of the situation relative to the bitrate at the output of the coding device, it is now possible, while knowing $NBRG_c$ or $NBRG_v$, to evaluate the number of bits per sliding GOP NBSG at the start of each new picture, in conformity with the following expression (35):

$$NBSG=NBSG-NBPP+PROF(t) \quad (35)$$

whose values have already been defined hereinbefore.

As far as NBSG is concerned, and as has been stated in the description of the process according to the invention, it is noted that the expression (35) should be interpreted in the sense of a data processing instruction, i.e. as a value transfer order: the execution of the indicated assigning operation (=) means that the contents of the term at the left of = must be replaced when said operation is terminated by the contents of the term at the right. Thus it is necessary to distinguish the initial value of NBSG on the one hand and its successive subsequent values on the other hand. Said initial value, denoted $NBSG_0$ is the global allocation NBRG for the real GOP concerned, which can be written as follows:

$$NBSG=NBSG_0=NBRG \qquad (36)$$

in which NBRG indifferently represents $NBRG_c$ or $NBRG_v$ (the expression (35) is valid in the two cases: constant bitrate or variable bitrate). Once this initial value of NBSG is determined, the expression (35) is fully applicable, indicating that there is an update at each picture by replacing the term NBSG by the term NBSG−NBPP+PROF(T), which gives said successive subsequent values.

The circuit 302 for estimating a number of bits per sliding GOP comprises on the one hand a circuit 303 for computing the global number of bits NBRG allocated per real GOP (this number NBRG is equal to $NBRG_c$ or $NBRG_v$ dependent on whether the bitrate is constant or has changed), and on the other hand a circuit 304 for computing the number of bits NBSG per sliding GOP, which receives the outputs of the circuits 301 and 303 and that of the circuit 304 itself and supplies a signal which is the output signal of the stage 300 for allocating the bits for each picture group.

This output signal is applied to a stage 400 for correcting the allocation of bits for each new picture, arranged in series with the stage 300 and comprising a circuit 401 for evaluating picture allocations. This circuit 401 provides the possibility of determining the value NBNP of the number of bits estimated for coding the next picture of the picture group in accordance with the following expression (37):

$$NBNP(T) = MAX \left[ 10000, \frac{X(T) \times NBSG(T)}{K(T) \times \sum_{k=I,P,B} N(k) \cdot X(k) \cdot K(k)} \right] \qquad (37)$$

in which expression all the values are defined previously (the value 10.000 will be explained hereinafter). To this end, the circuit 401 receives the output of the selection circuit 207 of the stage 200 and that of the circuit 304 for computing the number of bits per sliding GOP.

The output of this circuit 401 is applied to a circuit 402 for correcting the allocation which determines a corrected value CNNP(T) of the number of bits envisaged for coding said next picture of the picture group in accordance with the following expression (38):

$$CNNP(T)=CLIP(NBNP(T), MIN(CN), MAX(CN)) \qquad (38)$$

In this expression, NBNP(T) is supplied by the circuit 401. The values MIN(CN) and MAX(CN) are defined by the following expressions (39) and (40), respectively:

$$MIN(CN)=F_{min}(t)+R/P-F_e(PICST)+4R/(P\times NBSP) \qquad (39)$$

$$MAX(CN)=F_{sup}(t)-F_e(PICST)-(K_m \cdot R)/(P \times NBSP) \qquad (40)$$

in which:

$F_e(PICST)$ indicates, in numbers of bits, the real fullness of the buffer memory 10 at the start of the picture (i.e. at the start of its fast active slice, since a certain number of slices do not actively take part in a picture but simply correspond to data relating to line and field retrace periods, etc.).

$F_{sup}(t)$ is determined by the following expression (41):

$$F_{sup}(t) \int_0^{t+Db} R(x) \cdot dx \qquad (41)$$

$K_m$ is a constant relating to the number of non-active slices;

the other values have already been defined.

The function CLIP(NBNP(T), MIN(CN), MAX(CN)) then consists of choosing the among the three possible values NBNP(T), MIN(CN), MAX(CN) first value if NBNP(T) is between the other two values, or the second value if NBNP(T) is lower than this second value, or the third value if NBNP(T) is higher than this third value.

The device 110 for modifying the quantization step, shown in FIG. 4, comprises, in series with the stage 400, a stage 500 for modifying the quantization step. This stage 500 comprises a circuit 501 for initializing the fullness of the virtual buffer memory. This buffer memory is not physically present in the coding device, but its fullness is a concrete notion whose computation is useful for updating the quantization step in proportion to the coding of each picture. The fullness of this virtual memory may be initialized at the start of each picture of the type T in such a way that the initial quantization step is adapted to the number of bits appropriate for this current picture. Here, this initial state ISVB is determined in accordance with expression (42):

$$ISVB=X(T)/(CNNP(T) \times REAC) \qquad (42)$$

in which X(T) and CNNP(T) have already been defined and REAC is a feedback parameter which is here equal to 512/R and with which the importance of the feedback effected by the bitrate control sub-assembly can more or less be proportioned. After this initialization, the current state CSVB of said memory (Current State of the Virtual Buffer), i.e. its state just before coding of a jth macroblock begins (j being a positive integer) is given by the following expression (43):

$$CSVB=ISVB+PBAD-(CNNP(T) \times (j-1)/NMBP) \qquad (43)$$

in which:

ISVB, PBAD, CNNP(T), j have already been defined;

NMBP Number of Macroblock per picture) is the total number of macroblock per picture.

This determination of CSVB is effected by means of a circuit 502 for computing the current fullness of said virtual buffer memory which receives the output of the circuit 501 for initializing the fullness, the output of the VLC coding circuit 3 and the output of the circuit 402 for correcting the allocation of the picture. This circuit 502 is followed by a circuit 503 for determining the quantization step of the jth macroblock, which step Q(j) is provided by the following expression (44):

$$Q(j)=CSVB \times REAC \qquad (44)$$

in which REAC is the predetermined feedback parameter already occurring in expression (42). The quantization step thus evaluated in conformity with the invention can be applied either directly to the current macroblock or modified before this application by taking the local activity in the picture into account (i.e. by means of an adaptive quantization method, which is a conventional method and will therefore not be described here).

The invention is not limited to the embodiments described hereinbefore, from which many variations or improvements may be conceived without departing from the scope of the invention.

It should be particularly noted that the method and device described so far have for their object to maintain the fullness of the buffer memory 10 within limits ensuring both a correct operation and obtaining a good picture quality upon decoding. The tests which have been carried out have confirmed the effectiveness of the proposed technical solution. However, although this will certainly be very seldom, it should not be excluded that the conditions of transmitting the signals are very unfavourable and that problems occur in connection with said fullness. It is then useful to propose improvements providing the possibility of meeting these extremes at which the decoding memory tends to reach a situation of overflow or, in contrast, underflow of data.

In the first of these two extreme situations (overflow of the decoding memory), corresponding to the case where the fullness of the buffer memory 10 of the coding device has decreased to the point where it is very close to the lower limit given by the expression (25) defined above, bits referred to as stuffing bits are introduced into said buffer memory, whose number is, for example computed per picture slice. This number NSTB (Number of Stuffing Bits) at the start of each slice is given by the following expression (45):

$$NSTB=MAX(0, (F_{min}(SLE)-EBF(SLST)+2R(t)/P)) \qquad (45)$$

in which:

$F_{min}(SLE)$ is the value of $F_{min}$ at the end of the slice (SLice End);

EBF(SLST) is the value of EBF at the start of the slice (SLice STart);

P has already been defined.

If NSTB is positive (and if the slice concerned is an active slice) the initial state ISVB computed previously (expression (41)) is reduced by a given step in accordance with the following expression (46):

$$ISVB=ISVB-2/REAC \qquad (46)$$

The stuffing operation is realised in a stage 600 for complementary treatments. This auxiliary stage 600 represented in FIG. 4 as the basic stages 200 to 500, comprises a first processing circuit 601 in the event of underflow of coded data, provided for computing the number NSTB (in accordance with the above expression (45)) and for controlling the reduction of the value of the initial state ISVB via a connection between the output of the circuit 601 and the circuit 501 for initializing the fullness of the virtual memory.

Similarly, in the second situation (underflow of data in the decoding memory) corresponding to the case where the fullness of the buffer memory 10 of the coding device is raised to the point which is very close to the upper limit given by expression (24), all the DCT transform coefficients are set to zero during the whole slice of the picture concerned (with the exception of the first coefficient corresponding to the DC component and the initial state ISVB is raised in accordance with the same step as hereinbefore, i.e. in conformity with the following expression (47):

$$ISVB=ISVB+2/REAC \qquad (47)$$

This operation is also performed by the stage 600 for complementary treatment which to this end comprises a second processing circuit 602 in the event of overflow of coded data. When this circuit 602 ascertains that the expression (24) is no longer verified, i.e. when EBF(t) becomes greater than $F_{max}(t)$, it controls the zero setting of the coefficients via a first connection between the output of this circuit 602 and the discrete cosine transform circuit 1, and raises the value of the initial state ISVB via a second connection between the output of the circuit 602 and the circuit 501 for initializing the fullness of the virtual memory.

What is claimed is:

1. A method of coding digital signals which are representative of a sequence of pictures arranged in successive groups of N pictures each and subdivided into slices each regrouping a given number of picture macroblocks, comprising at least a step of quantizing and coding said signals and a step of controlling the bitrate of the coded signals by computing a complexity value of the picture and modifying the quantization step of the signals to be coded as a function of the complexity value thus computed, wherein:

(A) said complexity value is defined as a number of bits per picture proportional to the number of bits observed at the end of coding;

(B) the step of controlling the bitrate comprising the following sub-steps:

(1) for each given group of N successive pictures, evaluating a number of bits which comprise a group profile, said group profile having a value PROF which is proportional to said complexity value, to the number N, and to a bitrate R(t) observed at the coding output, and inversely proportional to the period of the pictures;

(2) for each new picture to be coded in the sequence:

(a) estimating a number of bits corresponding to said new picture and having a value NBNP which is proportional to said complexity value, and, a number of bits per sliding group having a value NBSG which is proportional to said group profile value PROF and to the difference between the value of NBSG for the preceding picture and a total number of allocated bits per picture having a value NBPP, each sliding group being defined as a composition of said new picture and (N–1) pictures which are adjacent thereto and with which they form a group shifting by one picture at each new picture;

(b) correcting said estimation value NBNP by evaluating a corrected number of bits corresponding to said picture and having a value CNNP chosen from three values comprising the estimated value NBNP and two limit values MIN(CN) and MAX (CN) of the fullness of a buffer memory for storing coded signals, the selection criterion being the selection of that value which is between the other two values; and, (3) for each macroblock of said new picture, computation of a coefficient for modifying the quantization step of said macroblock, said coefficient being equal or proportional to the sum of a number of bits expressing the initial fullness of a buffer memory defined as virtual memory and a complementary number which is equal to the number of bits already generated by coding the (j–1) macroblocks preceding the macroblock concerned of the rank j in the same picture, reduced by a number of correction bits related to the values of j and CNPP and to the number of macroblocks per picture.

2. A coding method as claimed in claim 1, wherein each sliding group for each new picture is composed of this picture and (N–1) pictures which follow.

3. A coding method as claimed in claim 2, wherein said complexity value, denoted X, is defined as being equal to the product of the number of bits observed at the end of coding by the average quantization step per picture.

4. A coding method as claimed in claim 3, wherein, while the pictures of the sequence are of a different type T referred to as I, P or B, respectively, dependent on whether they are subjected to an intraframe coding mode which is independent of any other picture, or to a predictive coding mode using a unidirectional motion prediction based on another intraframe coded or predicted picture, or to a bidirectional interpolation coding mode based on a previous picture and a subsequent picture, said complexity, denoted X(T), is defined as being equal to the product of the number of bits $S_i(T)$ observed at the end of coding a picture of the same type T by the average quantization step $Q_i^m(T)$ taken on a picture of the same type T.

5. A coding method as claimed in claim 4, wherein, while the pictures are of the type P, said complexity is defined as being equal to the smallest of said products $(S_i(T) \times Q_i^m(T))$ and $(S_{i-1}(T) \times Q_{i-1}^m(T))$ computed for a current picture and for the preceding picture of the same type P, respectively.

6. A coding method as claimed in claim 4, wherein initial values are imposed on said complexity for the first pictures of a sequence.

7. A coding method as claimed in claim 4, wherein the value of the group profile designated by PROF(T) is computed per type of picture T at the start of each given group and for the entire duration of this group.

8. A coding method as claimed in claim 7, wherein each value PROF(T) for T=I, P, or B is proportional to the expression $X(T) \times N \times R(t)$ computed for each type of picture T at the start of each given group.

9. A coding method as claimed in claim 7, wherein the initial value of the number of bits NBSG per sliding group is given by the expression:

$$NBRG = (NR_2/P) + WBF - F_e(GOPST) + (R_1 - R_2)D_b$$

in which:

N and P have already been defined;

$R_1$ and $R_2$ represent the two bitrate values before and after changing the bitrate when it is modified at the start of a given group, with $R_1 = R_2 = R(t)$ when, in contrast, there is no change of bitrate;

$D_b$ designates a constant delay between the instant of entry of the coded signals into said buffer memory for storing these coded signals and the instant when the decoded data leave a similar buffer memory arranged at the decoding end;

$F_e(GOPST)$ is the number of bits designating the real fullness of said buffer memory for storing the coded signals at the start of each given group;

WBF is a number of bits representing, at a constant bitrate or, when there is a change of the bitrate, after this change, the wished fullness of said buffer memory for storing the coded signals at the start of each given group.

10. A device for coding digital signals which are representative of a sequence of pictures arranged in successive groups of N pictures each and subdivided into slices each regrouping a given number of picture macroblocks, comprising at least means for quantizing and coding said signals associated with means for controlling the bitrate of the coded signals by computing a complexity value of the picture and modifying the quantization step of the signals to be coded as a function of the complexity value thus computed, wherein said means for controlling the bitrate comprise:

(A) means for evaluating the complexity as a function of the number of bits observed at the end of coding and as a function of the average quantization step per picture;

(B) means for estimating a number of bits NBNP for each new current picture to be coded in the sequence as a function of:

(1) a number of bits which comprise a group profile, said group profile having a value PROF which is computed successively for each given group of N pictures, and which is proportional to said complexity value, to the number N, and to a bitrate R(t) observed at the coding output, and inversely proportional to the period of the pictures;

(2) the following values, evaluated for each picture of the sequence:

(a) said complexity value, and, (b) a number of bits per sliding group having a value NBSG which is proportional to said group profile value PROF and to the difference between the value of NBSG for the preceding picture and a total number of allocated bits per picture having a value NBPP, each sliding group being defined as a composition of said new picture and (N-1) pictures which are adjacent thereto and with which they form a group shifting by one picture at each new picture;

(C) means for correcting the allocation of the bits for determining for each new picture to be coded a corrected number of bits having a value CNNP substituted for said value NBNP, and which is chosen from three values comprising said non-corrected allocation value NBNP estimated previously and two limit values MIN(CN) and MAX(CN) of the fullness of a buffer memory for storing the coded signals, the selection criterion being the selection of that value which is between the other two values; and, (D) means for modifying the quantization step of each macroblock of said new picture with the aid of a modification coefficient which is equal or proportional to the sum of a number of bits expressing the initial fullness of a buffer memory defined as virtual memory and a complementary number which is equal to the number of bits already generated by coding the (j-1) macroblocks preceding the macroblock concerned of the rank j in the same picture, reduced by a correcting number of correction bits related to the values of j and CNPP and to the number of macroblocks per picture.

11. A coding device as claimed in claim 10, wherein said means for controlling the bitrate comprise:

(A) a stage for determining the complexity for each new current picture to be coded as a function of the number of bits corresponding to the coded signals and of the average quantization step taken on a picture;

(B) a sub-assembly for modifying the quantization step, comprising in series:

(a) a stage for determining the allocation of bits NBSG per sliding group of pictures, the sliding group being the one which includes said current picture to be coded and the subsequent (N-1) pictures;

(b) a stage for correcting the allocation of bits for each new current picture to be coded as a function of said allocation NBSG per sliding group of pictures and of said limit values of the fullness of the buffer memory for storing the coded signals;

(c) a stage for modifying the quantization step as a function of said corrected allocation of bits CNNP.

12. A coding device as claimed in claim 11, wherein the successive pictures are of the type I, P or B, respectively, dependent on whether they are subjected to an intraframe coding mode which is independent of any other picture, or to a unidirectional predictive coding mode using unidirectional motion prediction based on another intraframe coded or predicted picture, or to a bidirectional interpolation coding mode based on a previous picture and a subsequent picture, wherein the stage for determining the complexity for each new picture to be coded comprises:

(a) a first memory for storing initialization values of the complexity for the first picture to be coded, and a first multiplication circuit for multiplying the number of bits resulting from coding the current picture via the output of a circuit for computing the average quantization step per picture wherein said first memory producing three outputs and said first multiplication circuit produces a fourth output;

(b) a circuit for selecting a single one of the four outputs of said first memory and said first multiplication circuit in accordance with the type I, P or B of the current picture and dependent on whether said current picture of the given type is or is not the initial picture of the sequence, the output of said selection circuit constituting said complexity value of the current picture concerned.

13. A coding device as claimed in claim 12, wherein the stage for determining said complexity value for each new picture to be coded further comprises:

(c) a second multiplication circuit receiving, via a second storage memory, the number of coding bits and the average quantization step which correspond to the picture of the same type preceding the current picture, said second multiplication circuit producing a fifth output, wherein said selection circuit also receives the fifth output of said second multiplication circuit for selecting one of the five outputs of said first memory and said first and second multiplication circuits in accordance with the type of picture and dependent on whether said current picture of the given type is or is not the initial picture of the sequence.

14. A coding device as claimed in claim 12, wherein the stage for determining the allocation of bits NBSG per sliding group of pictures comprises a circuit for computing the profile, or fixed allocation, for a given group of N successive pictures of the sequence, said computation being effected as a function of the type I, P, B and of the complexity of the first picture of this given group, and a circuit for estimating a number of bits, or allocation, per sliding group of pictures, said estimation being given by the following expression:

$$NBSG=NBSG-NBPP+PROF(T)$$

in which:

PROF(T) is said computed profile;

NBPP is the total number of bits per picture;

NBSG for the first picture of said sliding group of pictures is equal to an initialization value $NBSG_0=NBRG$ and for the subsequent pictures is the value NBSG obtained by the update effected in accordance with said expression;

NBRG represents the global allocation for said given group and is defined by the following expression:

$$NBRG=NR_2/P+WBF-F_e(GOPST)+(R_1-R_2)D_b$$

in which:

$F_e(GOPST)$ designates the real fullness of the buffer memory for storing the coded signals;

P designates the period of the pictures;

$R_1$ and $R_2$ designate the bitrate at the output of said buffer memory before and after the bitrate switching order, respectively, with $R_1=R_2=R(t)$ in the absence of bitrate switching;

$D_b$ is the sum of the delays $D_{cb}$ and $D_{db}$ due to said buffer memory of the coding device and to the buffer memory at the decoding end, to be associated therewith in a corresponding manner in a decoding device;

WBF is the wished fullness of said buffer memory at the start of each given group and is defined by the expression $WBF=F_{min}(t)+4R_2/(P \times NBSP)$ in which NBSP is a constant designing the number of picture slices per picture and $F_{min}(t)$ is the absolute lower limit of the fullness of said buffer memory.

15. A coding device as claimed in claim 14, wherein the instant of validation of the arbitrary switching order of the bitrate by said device coincides with the start of one of said given picture groups of the sequence.

16. A coding device as claimed in claim 15, wherein said absolute lower limit $F_{min}(t)$ has a constant value which is proportional to each desired bitrate after switching.

17. A coding device as claimed in claim 16, therefor futher comprising means for controlling the delay $D_b$.

18. A coding device as claimed in claim 16, wherein said estimation circuit comprises, in series, a circuit for computing the number of bits allocated per given group and a circuit for computing the number of bits per sliding group of pictures.

19. A coding device as claimed in claim 18, wherein the stage for correcting the allocation of bits for each new picture to be coded comprises a circuit for evaluating the number of bits, or allocation, envisaged for the next picture of said given group, followed by a circuit for correcting said allocation, and in that the stage for modifying the quantization step comprises, in series, a circuit for initializing the fullness of a virtual buffer memory, a circuit for computing the current fullness of said virtual memory and a circuit for determining the quantization step of each macroblock of the current picture.

20. A coding device as claimed in claim 19, therefor further comprising a stage for complementary processing operations, which stage comprises a first processing circuit in the event of underflow of coded data, whose output is connected to the circuit for initializing the fullness of the virtual memory, and a second processing circuit in the event of overflow of coded data, whose output is connected to the input of the quantization and coding means and to said circuit for initializing the fullness of the virtual memory.

21. A coding device as claimed in claim 15, wherein, with R(t) designating the instantaneous bitrate at the input of said buffer memory for storing the coding signals, $t_{end}$ being the instant at which the current picture is coded, DBPS being the real size of said decoding memory, and $t_0$ being the instant of switching the bitrate from the value $R_1$ to the value $R_2$, said absolute lower limit $F_{min}(t)$ is defined by the expression:

(a) for every $t_{end}<t_0$: $F_{min}(t)=MAX(0, (D_bR_1-DBPS))$;

(b) for every $t_{end}>t_0+D_b$: $F_{min}(t)=MAX(0, (D_bR_2-DBPS))$; and, (c) for every $t_{end}$ within the interval $[t_0, t_0+D_b]$: $F_{min}(t)=MAX(0, (D_bR_1+(t_{end}-t_0)(R_2-R_1)-DBPS))$.

22. A coding device as claimed in claim 15, wherein, with to being the instant of receiving an order for switching the bitrate from the value $R_1$ to the value $R_2$ and DBPS being the real size of said decoding memory, said absolute lower limit is defined:

(a) for every $t<t_0$ by the following expression:

$$F_{min}(t)=MAX(0,(D_bR_1-DBPS))$$

(b) for every $t \geq t_0+D_b$, by the following expression:

$$F_{min}(t)=MAX(0,(D_bR_2-DBPS))$$

(c) for every t within the interval $[t_0, t_0+D_b]$ by the following expression:

$$F_{min}(t)=MAX(0, (D_bR_1+(t-t_0)(R_2-R_1)-DBPS)).$$

* * * * *